T. Odion.
Fire Shield.
Nº 18,295.      Patented Sept. 29, 1857.
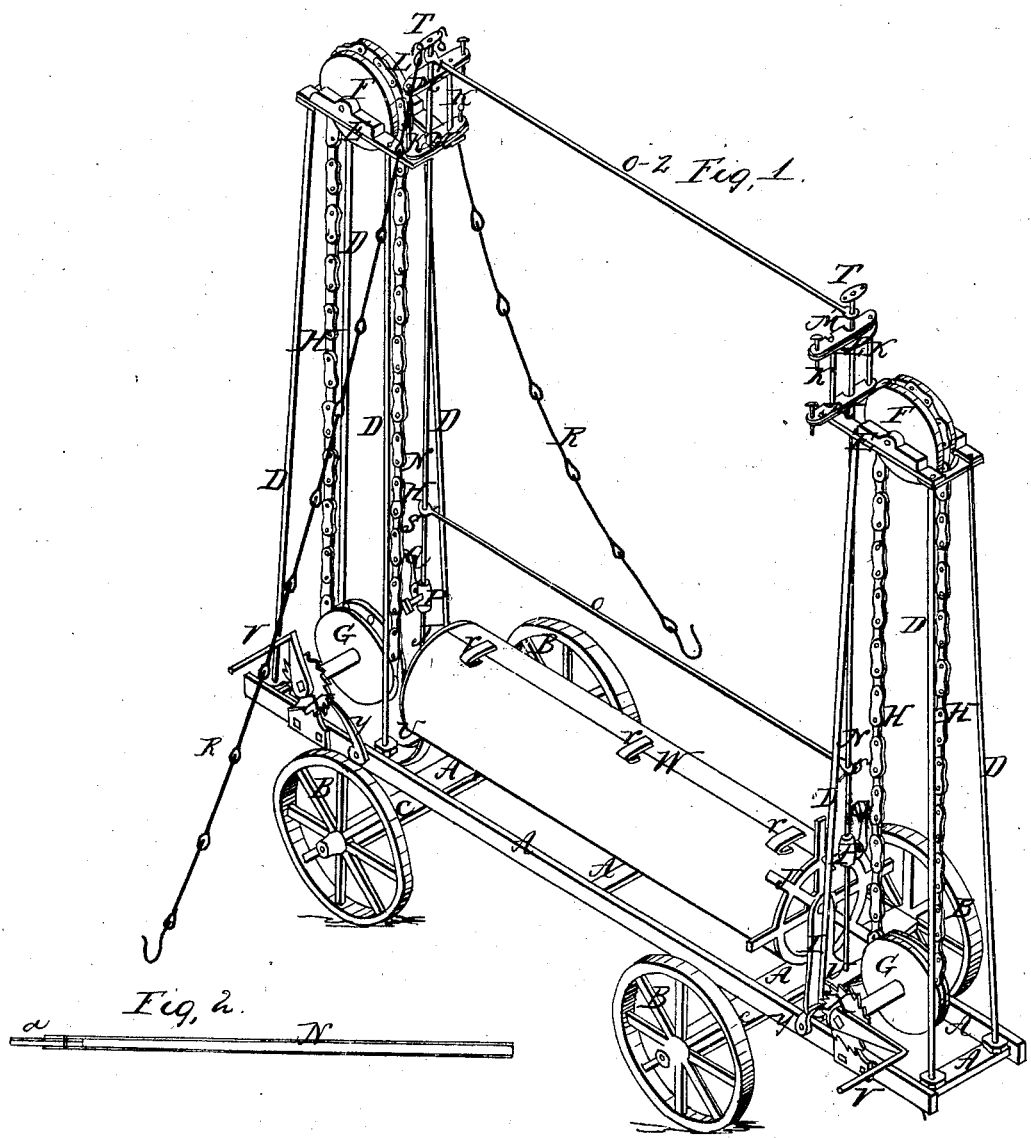

UNITED STATES PATENT OFFICE.

THOS. ODION, OF PORTSMOUTH, NEW HAMPSHIRE.

APPARATUS TO PROTECT BUILDINGS FROM FIRE.

Specification of Letters Patent No. 18,295, dated September 29, 1857.

*To all whom it may concern:*

Be it known that I, THOS. ODION, of Portsmouth, in Rockingham county, and State of New Hampshire, have invented certain new and useful Improvements in Building Fire-Protectors; and I do hereby declare that the following is a full, clear, and exact description thereof, reference being had to the accompanying drawing through letters of reference marked thereon, forming part of this specification, in which—

Figure 1 represents an isometrical view of my apparatus, and Fig. 2 a longitudinal section of the vertical sliding rods detached.

As the majority of fires originate in old, dilapidated, and most commonly in frame buildings, it is generally not so much an object to save the one on fire, as to protect the neighboring, more valuable property; and in case of deficiency of water, we have at present no adequate means of staying the raging element.

To supply this requisite is the object of my invention, which consists in constructing a portable metallic screen, that may be easily and speedily raised to any required height between two buildings, or in the street, to arrest the progress of the flames, or prevent their communicating with the surrounding property, which in the absence of a sufficient supply of water, will be effectual in saving an enormous amount of property.

To enable others to make and use my invention, I will proceed to describe its construction and operation.

I first construct a truck, consisting of an iron frame (A) from 35 to 40 feet in length, and of convenient width to receive the machinery, &c., to be hereinafter described; this frame, being mounted on four wheels (B), forms a carriage or truck, the axletrees (C) of which are attached to the frame by king bolts, and are provided with a tongue to each, to enable the truck to turn a sharp corner in a small space; on each end of the frame (A) are erected four uprights of bar iron, or wrought iron tubes (D) which are connected at the top by frames (E), which furnish journal bearings for the axles of the chain wheels (F); other chain wheels (G) are mounted on journals on the frame (A) beneath them, with endless chains (H) passing around them; on the axles of the lower chain wheels (G), are two ratchet wheels (X), one on each, with pawls (y) hinged on the frame (A) locking into their teeth.

In the center part of the truck, nearly filling the space between the chain wheels, is arranged longitudinally with the frame (A), a roller supported at each end on journals, in bearings (I) erected on said frame; this roller I construct with two flanges (J) keyed on a shaft, with a series of wrought iron rods or tubes connecting them, around and near their peripheries; the flanges (J) may either one or both, form sprocket or tiller wheels, so as to be turned by hand to rotate the roller; this roller forms a foundation on which to wind the necessary quantity of sheet iron, in sheets of about 30 feet wide (equivalent to the length of the roller) and about 10 or 12 feet deep, which are so constructed at top and bottom, that they can be connected together to form one continuous sheet.

On the inner ends of the frames (E) are erected standards (K), with capping pieces (L) to support their upper ends; to these uprights are jointed clamps (M, M',) at their top and bottom, through which rods (N) are free to play vertically; a bar or tube (O), having an eye at each end, spans and connects the two rods (N), horizontally above the sheet roller; these rods (N) are also provided with a socket or collar (P), which may be secured to them at any point by a set screw; to these collars are jointed hooks (Q), of suitable form to hook into the links of the endless chains (H).

To the upper edge of the sheet (W), are attached a number of hooks (r), by which it is connected with the bar (O); when it is intended to raise the sheet, pins (s) are passed through the rods (N) beneath the eyes of said bar, the hooks (Q) are connected with the endless chains (H), and their collars secured by the set screws to the rods (N) near their lower ends; the chain wheels (G) are then both rotated by cranks (V) on their axes, which raises the rods (N), and with them the bar (O) and sheet (W), by unwinding it from the roller until the ends of the bars come in contact with the lower clamps (M), which are then opened to allow it to pass up, and closed again and the upper ones (M') are opened, when it is again raised to allow it to pass them, after which they are closed again; the screw is then supported by the ends of the bar (O)

resting on the clamps (M'), in the position represented at (z), while the rods (N) are released from the chains, and allowed to slide down to their original position; a man then ascends, by rattlings, or in any other convenient manner, to the head of the endless chains, and secures the cross bar (O) to the rods (N), by inserting a pin, or tightening a collar by a set screw, underneath them, and at the same time attaches guy chains (R), to the caps (T) on the top of the rods (N); the hooks (Q) being again connected with the endless chains (H) and rods (N) as low down as possible, they may be raised as before until a section of rod (which I propose to construct of wrought iron tube, with socket joints, by riveting a shank (a) in one end, as represented in Fig. 2) can be connected at their lower ends, which are then let to rest on the feet (U), while the collar and hook can be again lowered, and connected as before, near the bottom with the chains and rods, when the sheet is again raised by turning the chain wheels; this may be repeated by adding sections of rod, until the screen is raised to the necessary height to protect the neighboring property, when the guy chains (R) are to be anchored to steady the top. A number of these screens may be arranged in a line, or entirely around a burning building, so as to prevent, to a great extent, the effect of wind upon the flames.

Having thus described my invention, what I claim as new and desire to secure by Letters Patent, is:

The method herein described of protecting property against fire, by means of a portable screen in the manner substantially as set forth or in any other equivalent manner.

In testimony whereof I hereunto set my hand this 18th day of July 1856.

THOMAS ODION.

Witnesses:
W. LERKI,
WM. M. SMITH.